United States Patent [19]
Scully et al.

[11] Patent Number: 5,982,399
[45] Date of Patent: *Nov. 9, 1999

[54] IMMEDIATE MODE DRAWING INTERFACE FOR THE CONSTRUCTION OF GRAPHICS SOFTWARE

[75] Inventors: Robert T. Scully, Albion; Ching-Chi Billy Hsu; Robert D. Covey, both of Alameda, all of Calif.

[73] Assignee: Autodesk, Inc., San Rafael, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/826,339

[22] Filed: Mar. 26, 1997

Related U.S. Application Data

[63] Continuation-in-part of application No. 08/667,614, Jun. 21, 1996, abandoned.

[51] Int. Cl.[6] .............................. G06F 15/00; G06T 1/00
[52] U.S. Cl. ......................... 345/522; 395/712; 709/300
[58] Field of Search ..................................... 345/501–506, 345/520, 522, 526; 395/712, 527, 680–685, 828, 830, 831, 390, 391, 567, 707; 709/300–305

[56] References Cited

U.S. PATENT DOCUMENTS

| | | | |
|---|---|---|---|
| 5,029,077 | 7/1991 | Fatahalian et al. ...................... | 345/112 |
| 5,083,262 | 1/1992 | Haff, Jr. .................................. | 395/500 |
| 5,113,517 | 5/1992 | Beard et al. ............................. | 395/500 |
| 5,241,625 | 8/1993 | Epard et al. ............................. | 345/502 |
| 5,337,402 | 8/1994 | Kitagawa et al. ....................... | 345/433 |
| 5,504,928 | 4/1996 | Cook et al. .............................. | 395/882 |
| 5,561,752 | 10/1996 | Jevans ..................................... | 345/433 |
| 5,680,592 | 10/1997 | Priem ...................................... | 395/527 |
| 5,724,074 | 3/1998 | Chainani et al. ....................... | 345/474 |
| 5,727,192 | 3/1998 | Baldwin ................................. | 345/522 |
| 5,742,796 | 4/1998 | Huxley .................................... | 345/502 |
| 5,745,659 | 4/1998 | Rigau Rigau et al. ................. | 395/102 |
| 5,745,762 | 4/1998 | Celi, Jr. et al. ......................... | 395/681 |
| 5,777,621 | 7/1998 | Schneider et al. ...................... | 345/428 |

*Primary Examiner*—Ulka J. Chauhan
*Attorney, Agent, or Firm*—Gates & Cooper

[57] ABSTRACT

An apparatus, method, and article of manufacture for providing compatibility between an application program and a renderer executing on a computer. An application program, executed by the computer, receives commands from a user via the input device and generates an output command stream in response thereto, wherein the output command stream comprises one or more instructions for generating the graphic images. A version renderer program, executed by the computer and coupled to the application program, translates the output command stream received from the application program into a renderer command stream. One or more renderer programs, executed by the computer and coupled to the version renderer program, receive the renderer command stream from the version renderer program, selectively modify the renderer command stream, and selectively transmit the renderer command stream to the graphics peripheral device or to one or more of the other renderer programs.

21 Claims, 9 Drawing Sheets

IMMEDIATE MODE DRAWING INTERFACE FOR THE CONSTRUCTION OF GRAPHICS SOFTWARE

CROSS-REFERENCE TO RELATED APPLICATIONS

This application is a continuation-in-part of Application Ser. No. 08/667,614, filed Jun. 21, 1996, by Matthew R. Arrott et al., entitled "IMMEDIATE MODE DRAWING INTERFACE FOR THE CONSTRUCTION OF GRAPHICS SOFTWARE", now abandoned, which application is incorporated by reference herein.

BACKGROUND OF THE INVENTION

1. Field of the Invention

This invention relates in general to graphics software construction, and in particular to immediate drawing interfaces.

2. Description of Related Art

In graphics software construction, renderers may be device drivers for virtual graphics devices. These virtual graphics devices, and their associated renderers, will have different capabilities—some might be photo-realistic, some might be especially fast, some will support hidden surface removal using a Z-buffer. They all essentially do the same things, such as draw lines, but they do them in different ways.

Existing renderers interact with specific devices. For example, a PCL (Printer Control Language) ADI (Autodesk Device Interface) renderer receives ADI commands from an application and provides PCL commands to a plotter. To draw figures on a screen, an application must provide commands to the particular renderer for that screen. This causes problems for the graphics software developer in that certain renderers may be better for some geometries, e.g., lines, while others may be better for other geometries, e.g., polygons. The developer must select one or the other.

Thus, there is a need in the art for a drawing interface that allows a graphics application to invoke multiple alternative renderers and graphics device drivers at run time. However, the ability to invoke multiple renderers at run time brings with it the need to manage versions of renderers. When the version of an interface between an application and a renderer changes, i.e., a new version of the interface is created, the renderer must be updated to adhere to the new interface or the application must continue to use the old interface. These are two distinct cases.

In the optimal situation, the renderer is updated to adhere to the new interface. When the renderer cannot be updated, the situation is sub-optimal, but accounting for the sub-optimal case should not impact the optimal case. That is, having a new application support an old renderer should not penalize the application's ability to use new renderers. The prior art, however, imposes an equivalent penalty on renderers, old and new alike. For example, the ADI pipeline handles driver versioning by always copying internal application data structures to the structures needed by the version of the renderer in use. This copying operation allows versioning to any new version, but it is at the expense of performance, and is always done, regardless of the renderer and application versions.

The Microsoft COM (Common Object Model) technology allows interfaces between software components to be modified while retaining the ability for an old component to talk to a new component. This is done through versioning of interfaces. The COM solution imposes an overhead burden that is unacceptable for graphics interfaces. This burden exists even for situations where an original interface has not been modified. In other words, the performance penalty is applied even for newly created components adhering to current interfaces. Thus, there is a need in the art for a drawing interface that provides improved versioning of interfaces.

SUMMARY OF THE INVENTION

To overcome the limitations in the prior art described above, and to overcome other limitations that will become apparent upon reading and understanding the present specification, the present invention discloses an apparatus, method, and article of manufacture for providing compatibility between an application program and a renderer executing on a computer. An application program, executed by the computer, receives commands from a user via the input device and generates an output command stream in response thereto, wherein the output command stream comprises one or more instructions for generating the graphic images. A version renderer program, executed by the computer and coupled to the application program, translates the output command stream received from the application program into a renderer command stream. One or more renderer programs, executed by the computer and coupled to the version renderer program, receive the renderer command stream from the version renderer program, selectively modify the renderer command stream, and selectively transmit the renderer command stream to the graphics peripheral device or to one or more of the other renderer programs.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
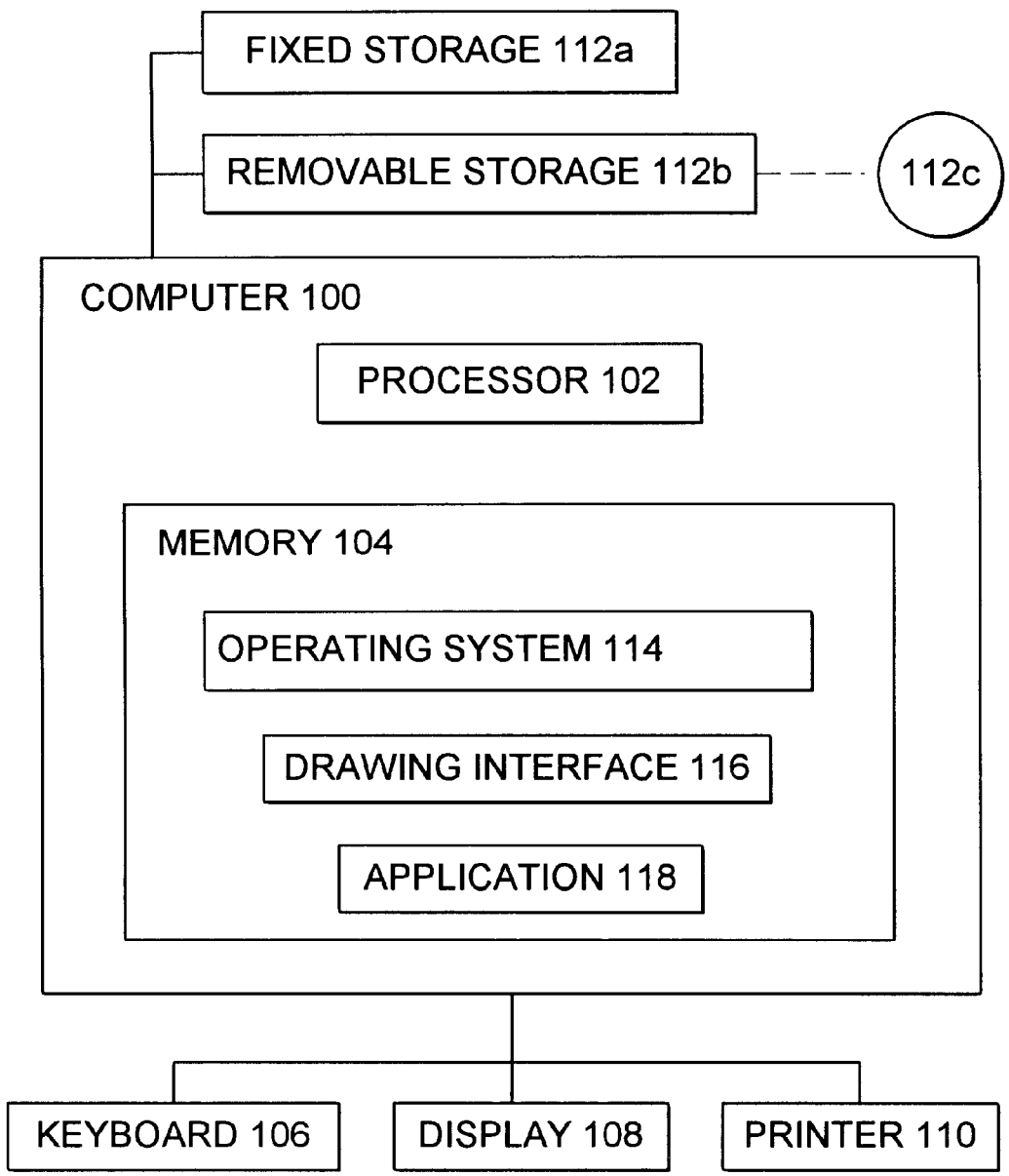
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. In the exemplary hardware environment, a computer 100 may include, inter alia, a processor 102, memory 104, keyboard 106, screen display 108, printer or plotter 110, as well as fixed and/or removable data storage devices 112a and 112b, and their associated media 112c. The computer 100 operates under the control of an operating system 114, such as OS/2™, Windows™, Macintosh™, AIX™, UNIX™, DOS™, etc. Those skilled in the art will recognize that any combination of the above components, or any number of different components, peripherals, and other devices, may be used with the computer 100.

The present invention is generally implemented through a drawing interface 116 for a graphics application 118. Generally, the operating system 114, drawing interface 116, and a graphics application 118 are all tangibly embodied in an article of manufacture such as a computer-readable medium or carrier, e.g., one or more of the fixed and/or removable data storage devices and their associated media 112a–c. Moreover, the operating system 114, drawing interface 116, and graphics application 118 are all comprised of instructions which, when read and executed by the computer 100, causes the computer 100 to perform the steps necessary to implement and/or use the present invention. Under control of the operating system 114, the drawing interface 116, and graphics application 118 may be loaded from the data storage devices 112a–c into the memory 104 of the computer 100 for use during actual operations in implementing and/or performing the present invention.

Stackable Renderers

In the present invention, the drawing interface 116 comprises a renderer stack for building graphic images, wherein the renderer stack includes multiple renderers that can be dynamically bound to graphics hardware at runtime. The invention allows complex drawing environments made up of multiple renderers, which support many different kinds of drawing hardware.

Figure 2:
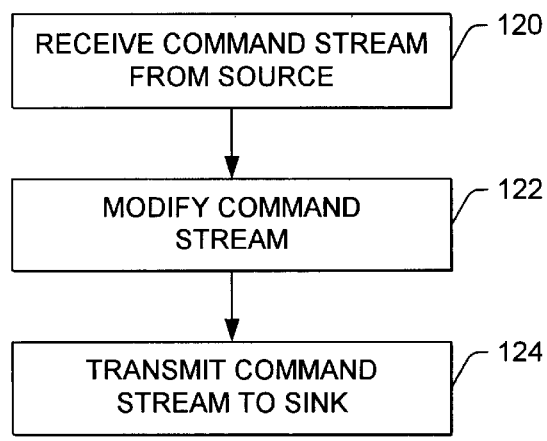
FIG. 2 is a flow chart illustrating the logic of the present invention.

FIG. 2 is a flow chart illustrating the logic performed by the drawing interface 116 according to the present invention. Block 120 represents a renderer receiving commands from a source in the memory 104 of the computer 100. The source may include a graphics application 118 or another renderer. Block 122 represents the renderer selectively modifying the commands in the memory 104 of the computer 100. Block 124 represents the renderer transmitting commands to a sink in the memory 104 of the computer 100. The sink may include physical hardware or another renderer.

Figure 3:
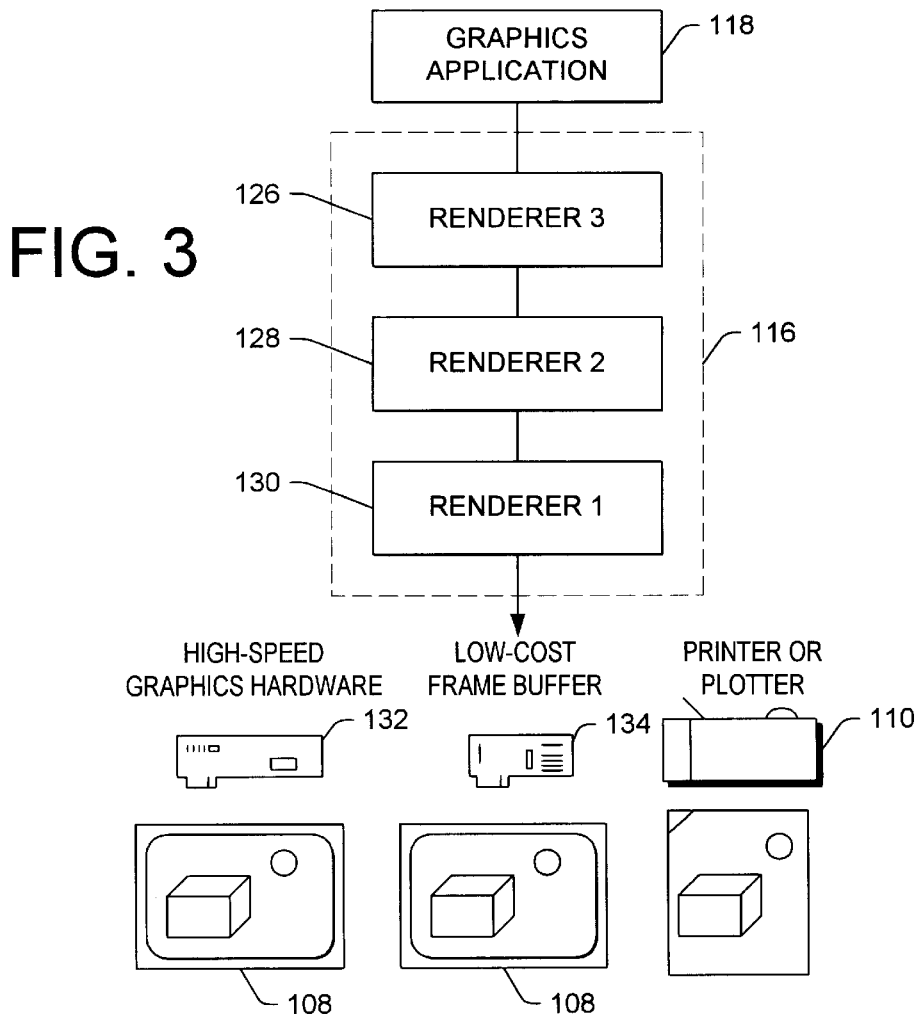
FIG. 3 is a block diagram illustrating an exemplary renderer stack in the present invention.

FIG. 3 is a block diagram illustrating an exemplary renderer stack comprising the drawing interface 116 of the present invention. The renderer stack comprises one or more renderers 126, 128, and 130. A graphics application 118 provides commands to the renderer stack. Each renderer 126, 128 and 130 in the stack receives drawing commands from a source, e.g., the renderer above it, and sends drawing commands to a sink, e.g., the renderer below it. For renderers 126 and 128, the sink is another renderer. For the bottom-most renderer 130, the sink is a device, e.g., high-speed graphics hardware 132, frame buffer 134, or printer or plotter 110.

Every renderer 126, 128, and 130 responds to the same set of commands. These commands include: configuration commands to set options on the renderer and push it on the renderer stack; drawing commands such as "draw a line" or "draw a triangle strip"; and an update command, which synchronizes the renderer with its sink so that any drawing commands previously received by the renderer are reflected in the sink renderer.

Because each renderer 126, 128 and 130 responds to exactly the same set of commands in the present invention, the renderers do not need to be compiled until runtime. This allows new renderers to be added to the drawing interface 116 without recompiling the graphics application 118. Multiple renders with different capabilities can be combined with the graphics application 118. Renderers can be dynamically loaded, allowing the graphics application 118 to only load those renderers it needs, and to load new renderers while it is running.

The bottom-most renderer 130 in a renderer stack is called a physical renderer. That is, a physical renderer is a renderer that does not require any sink renderer. The most common example of a physical renderer is a device driver, but there are also physical renderers that are not device drivers. One example of a renderer that is not a device driver is a selector, that is a renderer whose purpose is to test for pick hits and does not draw to any device.

Example Renderer Stack

Figure 4:
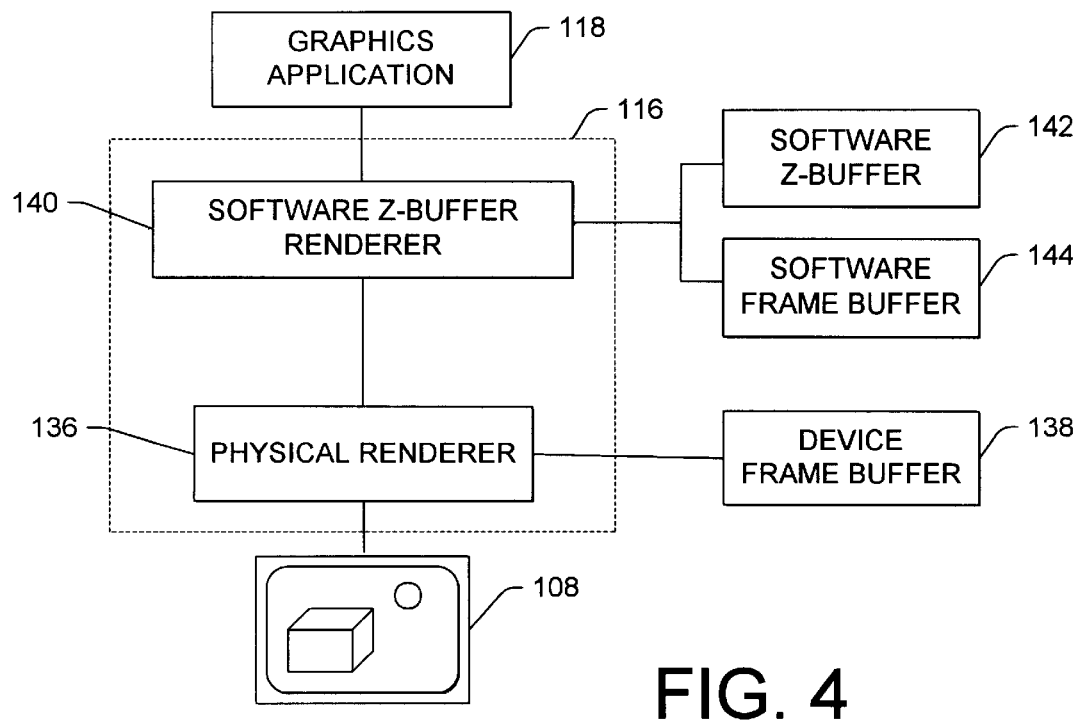
FIG. 4 is a block diagram illustrating the operation of an exemplary renderer stack in the present invention.

FIG. 4 is a block diagram illustrating the operation of an exemplary drawing interface 116 having a renderer stack according to the present invention. The bottom-most renderer 136 is a device driver for a simple graphics hardware device, such as a video display, and contains a frame buffer 138. The first renderer 140 in the stack is a software Z-buffer renderer 140, which includes a software Z-buffer 142 allocated in the memory 104 of the computer 100. In this example, the software Z-buffer renderer 140 also has its own software frame buffer 144 allocated in the memory 104 of the computer 100.

The graphics application 118 sends drawing commands to the software Z-buffer renderer 140, which removes hidden surfaces from an image in the software Z-buffer 142 using a standard Z-buffer algorithm and stores the modified image in its software frame buffer 144.

When an update command is sent to the software Z-buffer renderer 140, it transfers the contents of its frame buffer 144 to its sink, the physical renderer 136. Depending on how the physical renderer 136 is structured, this may or may not cause output to appear immediately on the video display 108. For example, the video display 108 may use double buffering, so images sent to it will not appear until it is told to switch buffers. Lastly, an update command is sent to the physical renderer 136, which results in the images appearing on the video display 108.

The update command tells a renderer to send any changes to its sink, but this actually does something only if the renderer buffers the drawing. A renderer might instead send output to its sink immediately after each drawing command. For example, a software Z-buffer renderer 140 can be built that does not have its own software frame buffer 144. As each drawing command is sent to this renderer 140, it rasterizes the images, compares the depth of the resulting pixels to the pixel depths in the software Z-buffer 142, and sends the visible pixels to its sink. If its sink is a physical renderer 136 that also does no buffering, then the images will appear immediately on the video display 108. Thus, as each drawing command is sent to the first renderer 140, the images appear immediately on the video display 108. In this case, after all drawing is done the graphics application 118 will still send an update command to each renderer 140 and 136, but these commands do nothing.

Since each update command only transfers information to the next renderer in the stack, it is important that the update commands are sent in the proper order. For the exemplary stack of FIG. 4, the graphics application 118 would update the renderers 140 and 136 from the top down the top renderer 140 first, and then its sink, the physical renderer 136.

Choosing a Renderer Stack

By choosing which renderers to put in the renderer stack, a graphics application 118 makes trade-offs that can affect the rendering speed and image quality. For example, in the example renderer stack of FIG. 4, it might appear wasteful to have two separate frame buffers 138 and 144. However, there are other factors to consider. Assuming that the physical renderer 136 does not do any buffering, a separate software frame buffer 144 in the first renderer 140 provides double buffering, which reduces screen flashing and provides smoother animation.

Even more importantly, on many platforms, including Microsoft Windows, transferring data to the device frame buffer 138 is much slower than writing into an equivalent buffer in main memory. The device frame buffer 138 is usually connected to the processor over an I/O bus that is slower than the main memory bus, and each write to a hardware device, such as a frame buffer, involves a system call and usually a context switch. Thus, rendering each graphics image into a software frame buffer 144, and then transferring the image to the graphics device with a single system call is usually much faster, often by an order of magnitude, than rendering each image into the device frame buffer 138.

If multiple renderers in the renderer stack have their own frame buffers, it is not necessary for these frame buffers to be the same size or even the same pixel depth. When a frame buffer is transferred to the sink renderer, it is sent using a regular renderer drawing command—the raster bit-blit command. Transferring a frame buffer is no different than any normal bit-blit operation on a renderer. Thus, the output of a renderer is always a sequence of renderer commands, which are sent to the sink renderer, except a physical renderer, which has no sink.

It is also possible for renderers to share a buffer. For example, if a renderer stack contains two software Z-buffers, then these could be configured to use the same buffer.

Sending Commands to Multiple Renders

The present invention does not limit the graphics application 118 to sending drawing commands to the first renderer 140; commands can be sent to any renderer 140 or 136 in the stack. In FIG. 4, the graphics application 118 might transmit a first image to the software Z-buffer renderer 140 and then transmit another image to the physical renderer 136, so that the second image overlays the first image.

Again, the graphics application 118 must send update commands at the proper times—in this case an update command should be sent to the software Z-buffer renderer 140 after the first image, and before the second image is sent to the physical renderer 136.

Figure 5:
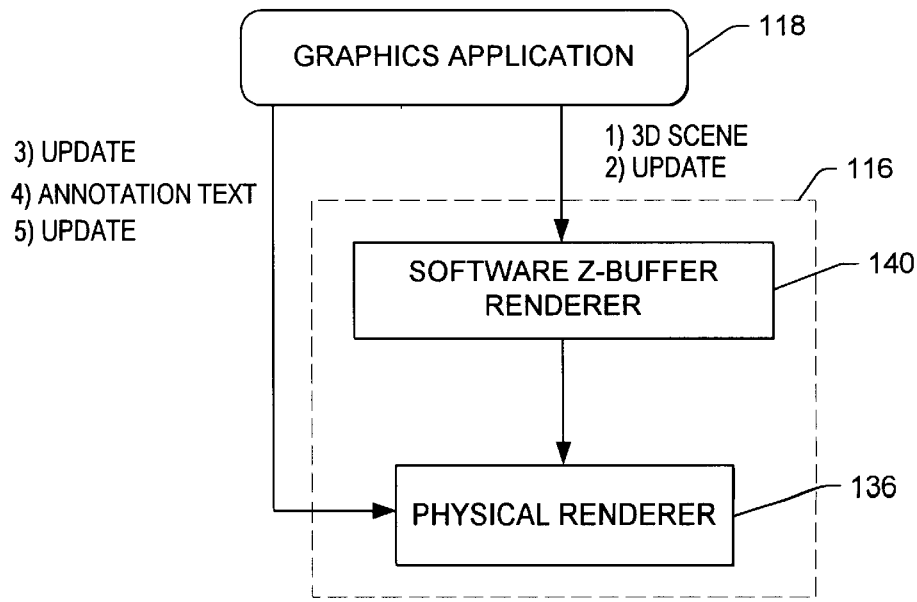
FIG. 5 is a block diagram illustrating an exemplary update cycle in the present invention.

FIG. 5 is a block diagram illustrating an exemplary update cycle according to the present invention. The order of the commands in an update cycle may be:

1. Send a 3D scene to the software Z-buffer renderer 140.
2. Send an update command to the software Z buffer renderer 140.
3. Send an update command to the physical renderer 136 (optional). If so, the 3D scene is guaranteed to appear on the video display 108; otherwise, it might or might not.
4. Send annotation text to the physical renderer 136.
5. Send an update command to the physical renderer 136.

Steps 3 and 5 send update commands to the physical renderer 136. If only step 5 is sent, then the only guarantee that something will appear on the video display 108 is after step 5. Omitting step 3, however, does not guarantee, or even imply, that nothing will appear until step 5. That depends on whether the physical renderer 136 buffers the scene. If the graphics application 118 wants each part of the image to appear as soon as possible, it should send the extra update command. If the graphics application 118 is only concerned with speed, it should omit it; if the physical renderer 136 does buffer the scene, then the extra updates might slow the system down.

Sending drawing commands to multiple renderers is especially useful as more renderers are added to the renderer stack. For example, a photo-realistic renderer may be at the top of the stack. Time can be saved by bypassing the photo-realistic renderer for those parts of the scene, e.g., text, that do not need the full treatment. Time can also be saved during user interaction, when an application can move an object around the screen quickly by sending it directly to the physical renderer.

Renderer Trees

The renderer stack does not have to be a vertical stack, with one renderer on top of another. Instead, the renderer stack can be arranged horizontally as well, and a renderer can have more than one source. Each renderer, however, can only have one sink. Thus, the renderer stack can actually take the form of a tree, with the physical renderer at the root of the tree.

Figure 6A:
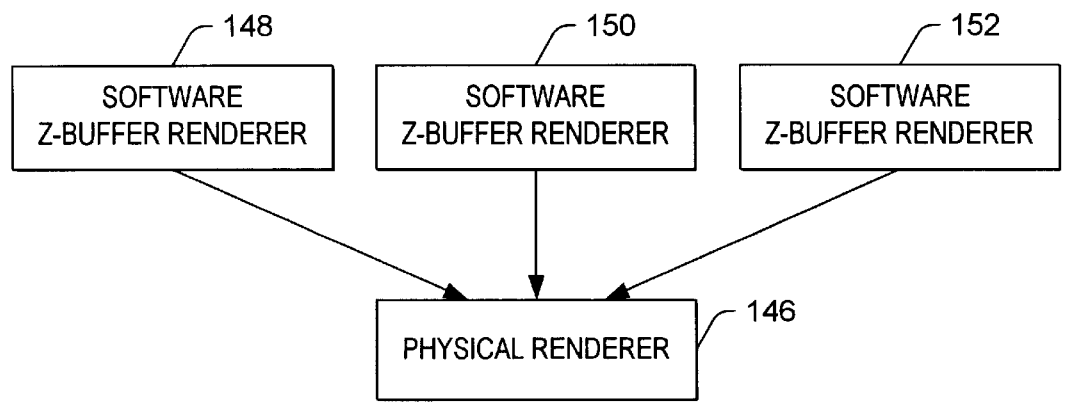
FIGS. 6A and 6B illustrate an exemplary renderer tree of the present invention.
Figure 6B:
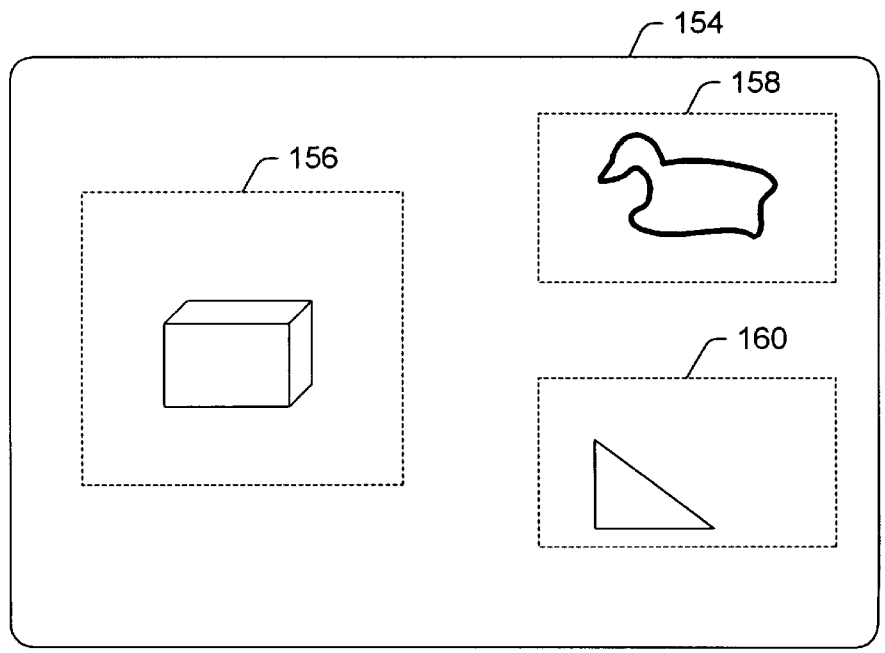

FIGS. 6A and 6B illustrate an exemplary renderer tree, wherein FIG. 6A illustrates a renderer stack with four renderers, one physical renderer 146 and three software Z-buffer renderers 148, 150, and 152, and FIG. 6B illustrates a possible result on the video display 108 for the renderer stack illustrated in FIG. 6A. This example might correspond to a graphics application 118 that has one large window 154 with multiple subregions 156, 158 and 160.

The physical renderer 146 corresponds to the overall window 154, and the top three renderers 148, 150, and 152 correspond to each subregion 156, 158, and 160. Each of the top three renderers 148, 150, and 152 can have different options set. In fact, they don't need to be the same kind of renderer at all. For example, one could be a photo-realistic renderer.

Each of the top three renderers 148, 150, and 152 has its position and screen size set separately as options. When one of these three renderers 148, 150, and 152 is sent an update command, it transfers its contents to its sink the single renderer 146 controlling the overall window 154. If the positions of the subregions 156, 158, and 160 overlap, then the last renderer updated appears on top. This means that if the graphics application 118 has overlapping subregions, it should update them from back to front. Note that. even though these subregions act like overlapping subwindows, they are not window system windows.

A renderer tree is built just like a stack—by pushing and popping renderers—but it is legal to push more than one renderer on top of the same renderer. Also, there will usually only be a single path through the tree, which is a stack.

Multiple Renderer Stacks

The graphics application 118 can also interface to multiple renderer stacks. This is useful for supporting multiple output devices. For example, to print a scene, the graphics application 118 can build a renderer stack on top of a physical renderer for a printer. The same drawing commands that were used to draw the scene are then sent to this new renderer stack, and the scene is printed.

For selection operations, the graphics application 118 can have a renderer stack built on a physical renderer that performs hit testing. Such a renderer is called a selector renderer. The selector renderer is sent the coordinates of the pick, the scene is then sent to the stack, and the selector renderer reports if any geometry was picked. Note that if the graphics application 118 uses a scene manager or stores bounding boxes for geometry, then it may be more efficient to perform hit-testing another way.

When a graphics application 118 builds a new renderer stack, it will start with a different physical renderer, but any renderers pushed on top of that renderer might need to be different as well. For example, if the physical renderer is for a high resolution printer, then its preferable not to use a Z-buffer renderer to remove hidden surfaces. A renderer based on some object space algorithm would be more appropriate. Likewise, if the physical renderer is for a pen plotter, rasterizing the primitives is not necessary, and you might want to add a separate renderer to do pen optimization.

Life Cycle of a Renderer

Figure 7:
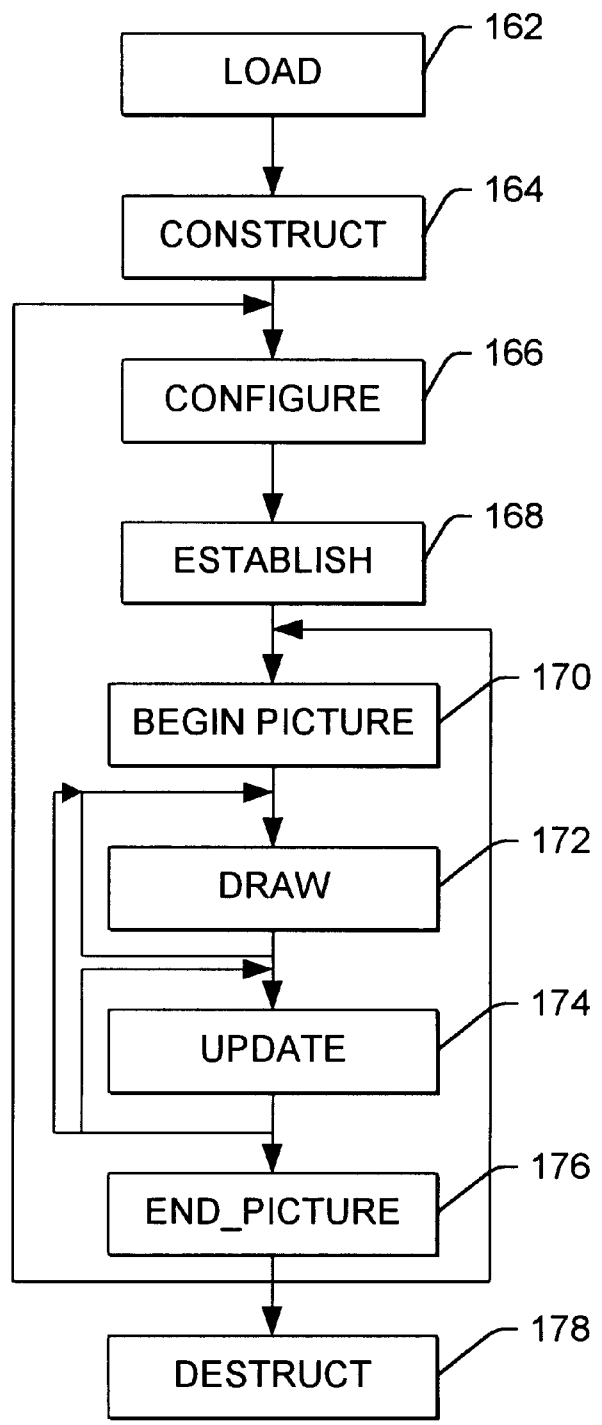
FIG. 7 is a block diagram representing the life cycle of a renderer according to the present invention.

FIG. 7 is a block diagram representing the life cycle of a renderer.

Block 162 represents the graphics application 118 loading the renderer in the memory 104 of the computer 100. Since the graphics application 118 can load renderers dynamically, the renderer will be loaded if it has not been previously loaded.

Block 164 represents the graphics application 118 constructing an instance of the renderer in the memory 104 of the computer 100. Once the renderer is loaded, an instance is constructed by calling a generator function. A renderer instance is constructed in the context of its sink. Physical renderers are the only renderers that can be constructed independently. Multiple instances of a renderer may be constructed to draw into multiple windows, for example.

Block 166 represents the graphics application 118 configuring the renderer's options in the memory 104 of the computer 100. Different renderers will have different options.

Block 168 represents the graphics application 118 establishing the renderer in memory 104 of the computer 100. The establish command reconciles the options of the current renderer with those of its sink. It also causes the renderer to do any necessary option-specific setup.

Block 170 represents the graphics application 118 informing the renderer that a drawing sequence is about to begin by sending a begin_picture message to it in the memory 104 of the computer 100.

Block 172 represents the graphics application 118 sending drawing commands to the renderer in the memory 104 of the computer 100.

Block 174 represents the graphics application 118 sending the update command to the renderer in the memory 104 of the computer 100. When the graphics application 118 is done sending drawing commands to the renderer, it will call the update command. For multiple renderers in a stack, the graphics application 118 will send update commands to all renderers, from the top-down. At this point, a scene is displayed.

Block 176 represents the graphics application 118 signaling the renderer that a drawing sequence has completed in the memory 104 of the computer 100. The graphics application 118 signals to the renderer that a drawing sequence has completed by sending an end_picture message to it. The graphics application 118 can then either go back to drawing, or go all the way back and reconfigure the renderer with different options. If the graphics application 118 changes any options on a renderer, it must re-establish that renderer and all renderers above it in the renderer stack.

Block 178 represents the graphics application 118 sending a destruct command to the renderer in the memory 104 of the computer 100. After the graphics application 118 is done with the renderer, the renderer must be deleted, along with all the renderers above it in the stack. This must be done in the opposite order in which they were constructed.

Configurable parameters for renderers are implemented through options. An option is a definition/value pair. These options can exist by themselves, but more likely, they will be contained in a linked list called an option table. Option tables are linked lists containing definition/value pairs in which a renderer may define renderer-specific options that indicate a capability that a graphics application 118 or end-user may be interested in controlling.

For example, if a renderer is capable of performing double-buffering, then it might provide an option whose name is a string "Double Buffering" which can take on a Boolean option value which enables or disables this feature. The option definition contains the name of the option as well as its type specifier, in this case "Double Buffering" and Boolean, respectively. The option value also contains a matching type specifier as well as the actual values of the option, stored in an array. Multiple option definitions are stored in an option definition table which is a linked list of option definitions. Multiple options are stored in an option table which is a linked list of options.

The functions of a particular device driver are encapsulated in an HD_Device class. The HD_Device class has base classes HT_Physical_Renderer and HT_Renderer. The default constructors for classes HT_Renderer and HT_Device initialize the option tables to have entries for the renderer options, e.g., window size, window origin, buffer depth, pixel aspect, color system, palette, and alpha blending, and device driver options, e.g., window id, context id, colormap id. Further, the default constructors initialize these options to have trivial values, almost certainly needing to be re-set at some stage of the configuration process.

Device drivers may also add driver-specific options which the application may wish to control. For example, if the device supports double buffering, the device driver may include an option that controls whether double buffering is in effect. The constructor for the device driver will have the responsibility of adding entries for these driver-specific options to the option tables.

Renderer Linkage

A renderer is a module that the graphics application 118 loads dynamically at runtime. In particular, a renderer for Microsoft Windows platforms is contained in a DLL module. This module must export a routine called "HD_Device", which performs the renderer initialization and returns a pointer to an object of the class HT_Device.

Each renderer has an action table associated with it. The action table contains an entry for each draw command understood by the renderer. The draw commands are divided into three categories: 3D commands, e.g., Draw_3D_Tristrip; 2D commands, e.g., Draw_2DPolyline; and DC commands, e.g., Draw_DC_Rectangle.

The "DC" stands for "device coordinates", but in reality the 2D commands also take device coordinates. The difference between 2D and DC commands is that 2D commands do clipping, while DC commands assume that valid pixels are being written, and do no error checking. Another difference is the 2D command take higher level primitive descriptions that may include additional information such as vertex normals or face normals, etc.

The action table itself is arranged into a kind of hierarchy, with more "complex" commands with the 3D commands, and simpler commands with the DC commands. At the simplest level is the Draw_DC_Image command that just draws an array of pixels.

A library of standard drawing actions can be called to draw geometry in terms of other geometry that the renderer can handle. By default, the action table is initialized to point to these standard drawing actions. The renderer may override these actions with its own implementations that take advantage of their hardware's specific capabilities.

Every renderer is required to respond to every command in the action table. If a renderer does not provide a particular entry in the action table by providing its own action or inserting a standard drawing action, it inherits the action from the sink renderer. This makes it easy to implement extension renderers. The purpose of these renderers is to provide specific valuable rendering services, but not. to provide a complete replacement of functionality with respect to its sink.

For example, there might be a different method of drawing 3d polytriangles that one might find useful in some situations. For that case, the renderer developer need only fill in that particular action, leaving the remainder free. By not explicitly filling in the remainder of the actions with standard entries, the renderer inherits actions from its parent.

More complex commands in the action table are normally implemented in terms of simpler commands. Consider a physical renderer for a simple full color display card. The only command that must be written specifically for the display card is the Draw_DC_Image command, which provides the lowest level way to transfer pixels to the device frame buffer. Once this is available, all other commands in the action table can be implemented using it, either directly or indirectly. For example, the Draw_3D_Polyline command can be implemented as follows: first, Draw_3D_Polyline projects the 3D polyline into a 2D polyline using the current viewing transformation, and calls the Draw_2D_Polyline command; second, Draw_2D_Polyline divides the 2D polyline into multiple 2D line segments, clips each line against the viewport and creates spans of pixels; and third, the Draw_DC_Dot command draws the pixels in the frame buffer.

Standard drawing actions are provided to implement every command in the action table, except Draw_DC_Image. Those commands that are not implemented by the renderer developer are inherited from the sink renderer. Thus, supporting a new device can be as simple as writing Draw_DC_Image. Of course, the above command sequence is only one of many ways that Draw_3D_Polyline could be implemented. For example, the 3D polyline could be clipped in 3D rather than 2D or some of the steps can be done in hardware.

If the graphics device has graphics acceleration hardware, the draw commands may be implemented directly. For example, many graphics cards have hardware to draw lines, so the Draw_DC_Polyline command can be implemented using this hardware, rather than rasterizing the line in software and transferring it into the frame buffer with Draw_DC_Image. If the graphics hardware implements polylines, then the Draw_DC_Polyline command should be implemented directly.

At the high end, some graphics hardware implements 3D primitives directly. For example, the best way to implement Draw_3D_Polyline might be to send the 3D polyline straight to the device.

The action table implements a scaleable device interface—the interface scales easily to match a wide range of graphics hardware, from simple dumb frame buffers, to high-speed graphics pipelines, to printers and plotters. For inexpensive hardware, the action table fills in with software, but it is possible to take advantage of high-end hardware when it is available.

Version Renderer

Figure 8:
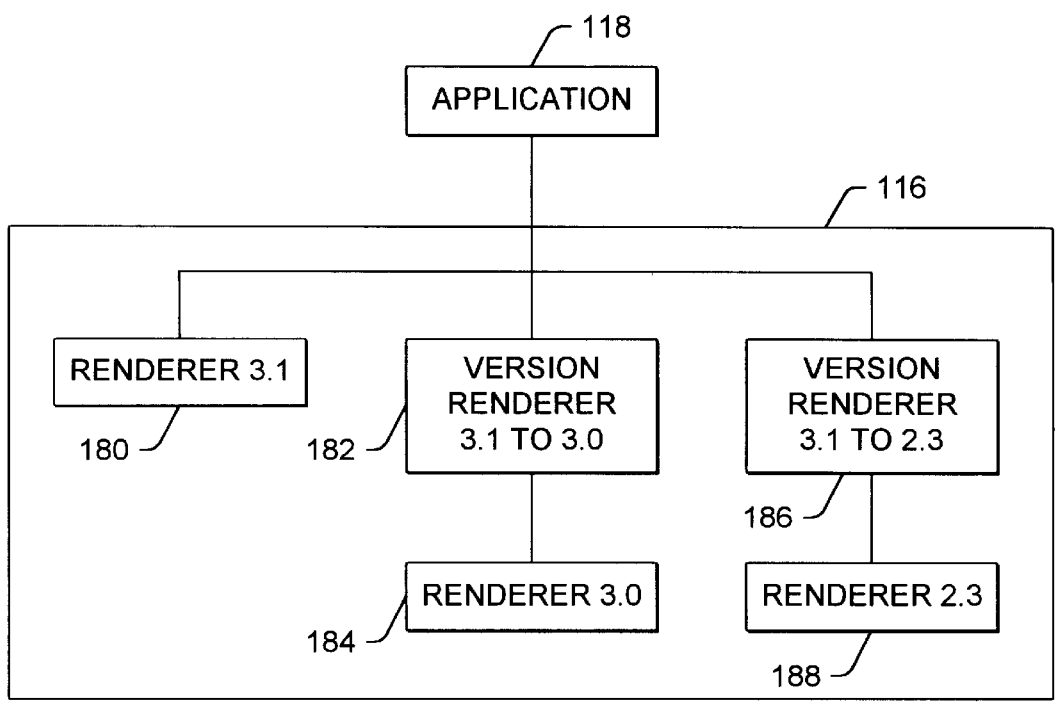
FIG. 8 is a block diagram that illustrates a version renderer according to the present invention.

FIG. 8 is a block diagram that illustrates a version renderer according to the present invention, wherein the drawing interface 116 provides for communication between an application 118 and a new version of a renderer 180, a version renderer 182 and an older version of a renderer 184, and a version renderer 186 and an older version of a renderer 188. In this example, assume that application 118 is directly compatible with a renderer 180, which is labeled as version 3.1. However, also assume that application 118 is directly compatible with a version renderer 182, which is labeled as version 3.1 to 3.0, and a version renderer 186, which is labeled as version renderer 3.1 to 2.3. The version renderer 182 is an interface or driver that translates commands between the application 118 and an older renderer 184 labeled as version 3.0. The version renderer 186 is an interface or driver that translates commands between the application 118 and an older renderer 188, labeled as version 2.3. Note that the version renderers 182 and 186 could also translate commands between an older version of the application 118 and newer versions of the renderers 184 and 188, respectively. In general, the version renderers 182 and 186 translate commands or instructions between the application 118 and one or more renderers 184 and 188. Additionally, the version renderers 182 and 186 translate commands from the renderers 184 and 188, respectively, to the application 118.

Figure 9:
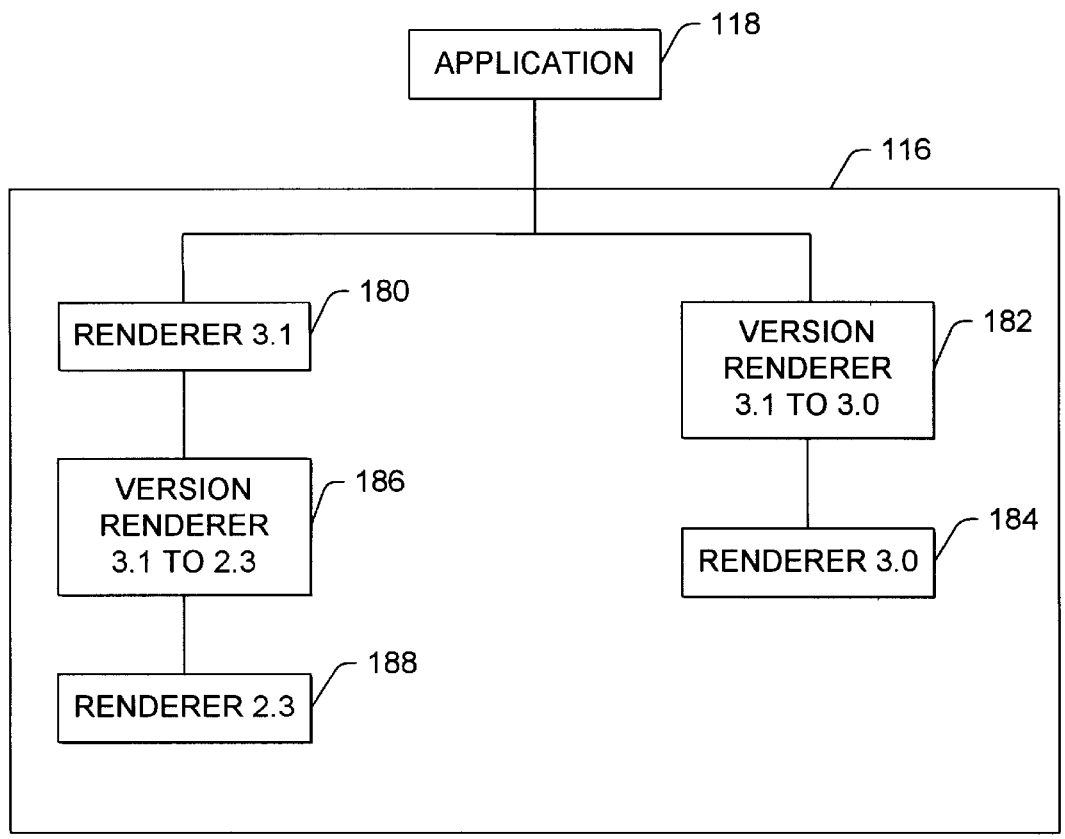
FIG. 9 is a block diagram that illustrates a version renderer according to the present invention, wherein the version renderer is a sink for a renderer rather than for an application.

FIG. 9 is a block diagram that illustrates a version renderer 186 according to the present invention, wherein the version renderer 186 is a sink for a renderer 180 rather than for an application 118. In the architecture of the present invention, a version renderer can be located at any position in a renderer stack. For example, in FIG. 9, the version renderer 186, which is labeled version renderer 3.1 to 2.3, is a sink for another renderer 180, which is labeled renderer 3.1. The version renderer 186 is a source for another renderer 188, which is labeled renderer 2.3. In this example, the version renderer 186 receives commands from the renderer 180 and translates these for forwarding to another renderer 188.

Figure 10:
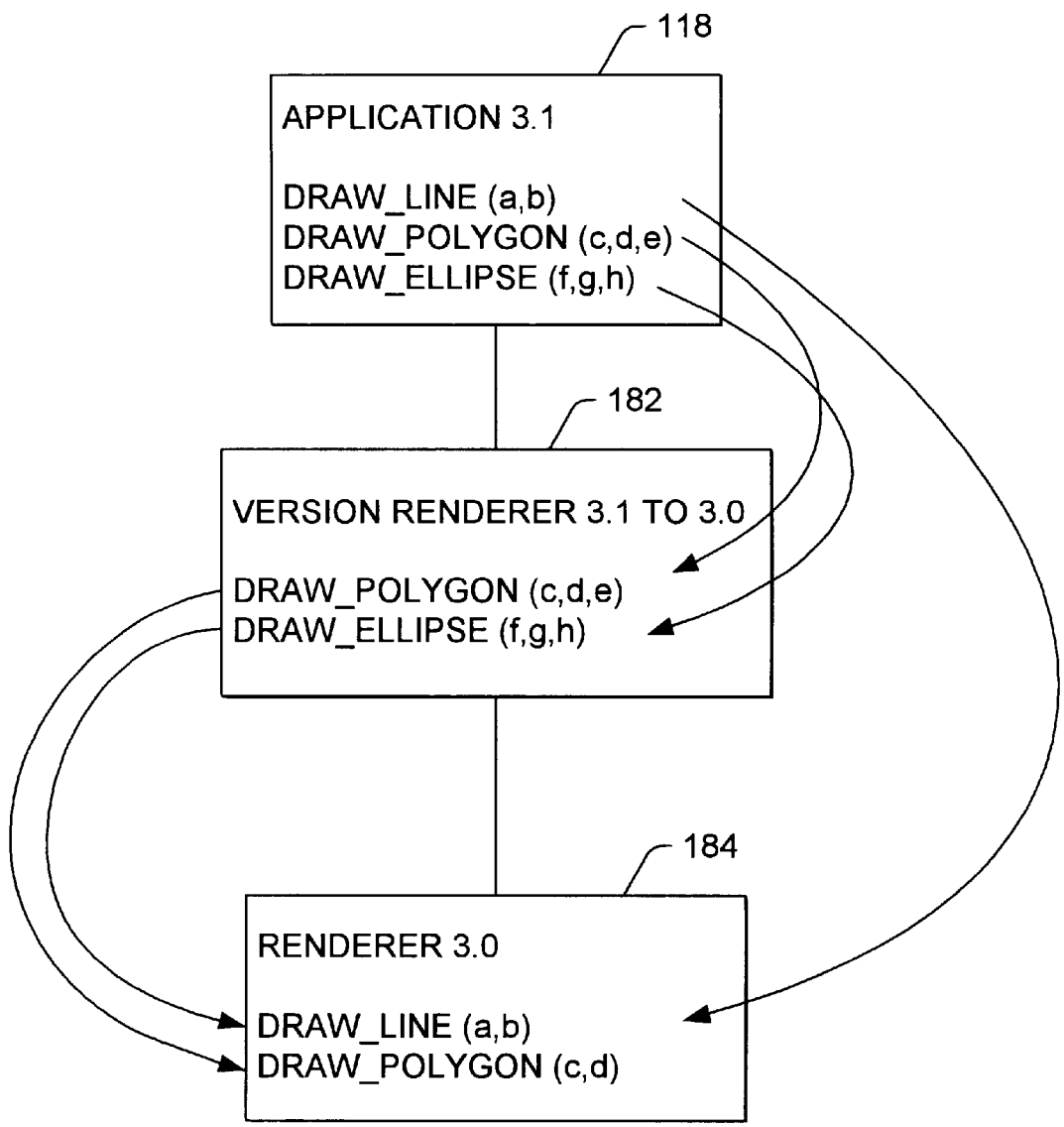
FIG. 10 is a block diagram that illustrates the translation performed by a version renderer according to the present invention, wherein the version renderer translates commands from an application and forwards the translated commands to a renderer.

FIG. 10 is a block diagram that illustrates the translation performed by a version renderer 182 according to the present invention, wherein the version renderer 182 translates commands from an application 118 and forwards the translated commands to a renderer 184. The application 118, which is labeled application 3.1, is directly compatible with a version 3.1 renderer. However, the application 118 is using a version 3.0 renderer 184. The application 118 transmits the following commands to the version renderer 182: draw_line (a,b), draw_polygon (c,d,e), and draw_ellipse (f,g,h). These commands are supported by the version 3.1 renderer, but the version 3.0 renderer 184 only supports the following commands: draw_line (a,b) and draw_polygon (c,d). The version renderer 182 allows unchanged commands to simply pass through to the version 3.0 renderer 184. Therefore, the draw_line (a,b) command, which is supported by the version 3.0 renderer 184, passes through the version renderer 182 without modification to the version 3.0 renderer 184.

The version_renderer translates commands supported by the version 3.1 renderer and not the version 3.0 renderer so that the version 3.0 renderer 184 can execute them. In particular, the version renderer 182 transforms the draw_polygon (c,d,e) command to the draw_polygon (c,d) command by ignoring the parameter "e", which the version 3.0 renderer 184 does not support. The version renderer 182 transforms the draw_ellipse (f,g,h) command to a draw_line(a,b) command because the version 3.0 renderer 184 does not support the draw_ellipse command.

Figure 11:
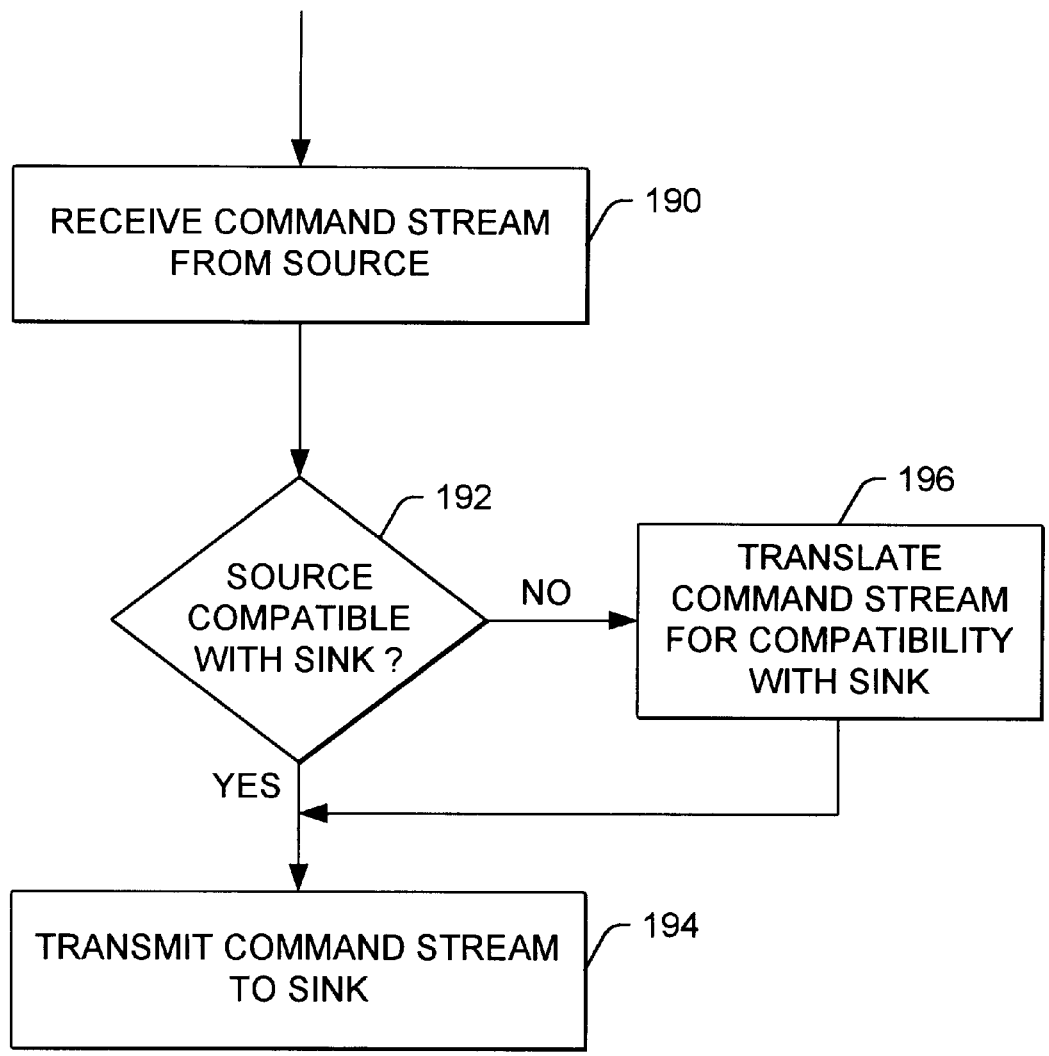
FIG. 11 is a flow chart illustrating the logic of the version renderer according to the present invention.

FIG. 11 is a flow chart illustrating the logic of the version renderer 182 according to the present invention. Block 190 represents the drawing interface 116 receiving a command stream from a source, such as an application 118. The command stream contains one or more instructions to be executed by a renderer within the drawing interface 116. Block 192 represents the drawing interface 116 determining whether the version of the source is compatible with the version of the sink, such as a renderer, based on the instructions in the command stream. When the versions of the source and the sink are compatible, Block 194 represents the drawing interface 116 forwarding the command stream to the sink. When the versions of the source and the sink are not compatible, Block 196 represents the drawing interface 116 translating the command stream, via a version renderer, such as version renderer 3.1 to 3.0 182, so that it is compatible with the sink. The version renderer 182 may perform the translations using an action table or other techniques.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for generating graphic images using a renderer program, comprising:

a computer having a graphics peripheral device and an input peripheral device attached thereto;

a first version of the renderer program, executed by the computer, for receiving a command stream in a first format, for selectively responding to commands within the command stream, for selectively modifying the command stream, and for transmitting the command stream directly to the graphics peripheral device or directly to another renderer program;

a second version of the renderer program, executed by the computer, for receiving a command stream in a second format, for selectively responding to commands within the command stream, for selectively modifying the command stream, and for transmitting the command stream directly to the graphics peripheral device or directly to another renderer program;

an application program, executed by the computer, for receiving commands from the input device and for generating an application output command stream in response thereto, wherein the application output command stream is in the first format so that it is compatible with the first version of the renderer program, and comprises one or more instructions for generating the graphic images;

a version renderer program, executed by the computer and coupled between the application program and the second version of the renderer program, for receiving the application output command stream from the application program, for selectively transforming the application output command stream into a command stream in the second format so that it is compatible with the second version of the renderer program, and for transmitting the selectively transformed application output command stream to the second version of the renderer program.

2. The system of claim 1, wherein the first version of the renderer program is an earlier version than the second version of the renderer program.

3. The system of claim 1, wherein the first version of the renderer program is a later version than the second version of the renderer program.

4. The system of claim 1, wherein a version of the application program is an earlier version than the second version of the renderer program.

5. The system of claim 1, wherein a version of the application program is a later version than the second version of the renderer program.

6. The system of claim 1, wherein the renderer programs support different kinds of graphics hardware.

7. The system of claim 1, wherein the renderer programs are stackable into a renderer stack.

8. The system of claim 7, wherein the renderer stack includes multiple renderer programs that are selectively and dynamically bound to the graphics hardware during execution.

9. The system of claim 7, wherein the renderer stack comprises a tree.

10. The system of claim 1, wherein the renderer programs are stackable into multiple renderer stacks.

11. The system of claim 1, wherein the application output command stream is transmitted to multiple renderer programs.

12. A system for generating graphic images, comprising:

a computer having a graphics peripheral device and an input peripheral device attached thereto;

a first version of an application program, executed by the computer, for receiving commands from the input device and for generating an application output command stream in a first format in response thereto, wherein the application output command stream in the first format comprises one or more instructions for generating the graphic images;

a second version of the application program, executed by the computer, for receiving commands from the input device and for generating an application output command stream in a second format response thereto, wherein the application output command stream in the second format comprises one or more instructions for generating the graphic images;

a renderer program executed by the computer, compatible with the application output command stream in the first format, for transmitting a command stream directly to the graphics peripheral device or directly to another renderer program; and a version renderer program, executed by the computer and coupled between the second version of the application program and the renderer program, for selectively transforming the application output command stream in the second format into a renderer command stream that is compatible with the renderer program and for sending the renderer command stream to the renderer program.

13. The system of claim 12, wherein the first version of the application program is an earlier version than the second version of the application program.

14. The system of claim 12, wherein the first version of the application program is a later version than the second version of the application program.

15. The system of claim 12, wherein a version of the renderer program is an earlier version than the second version of the application program.

16. The system of claim 12, wherein a version of the renderer program is a later version than the second version of the application program.

17. A method of generating graphic images on a computer having a graphics peripheral device and an input peripheral device attached thereto, comprising the steps of:

receiving commands from the input device at an application program executed by the computer;

generating an application output command stream at the application program, wherein the application output command stream is compatible with a first version of a renderer program and comprises one or more instructions for generating the graphic images;

selectively transforming the application output command stream into a renderer command stream that is compatible with a second version of the renderer program at a version renderer program executed by the computer, wherein the version renderer program is coupled between the application program and the second version of the renderer program;

transmitting the renderer command stream from the version renderer program to the second version of the renderer program;

selectively modifying the renderer command stream at the second version of the renderer program; and selectively transmitting the renderer command stream from the second version of the renderer program directly to the graphics peripheral device or directly to one or more of the other renderer programs.

18. The method of claim 17, wherein the first version of the renderer program is an earlier version than the second version of the renderer program.

19. The method of claim 17, wherein the first version of the renderer program is a later version than the second version of the renderer program.

20. The method of claim 17, wherein a version of the application program is an earlier version than the second version of the renderer program.

21. The method of claim 17, wherein a version of the application program is a later version than the second version of the renderer program.

* * * * *